US009886962B2

(12) United States Patent
Motta et al.

(10) Patent No.: US 9,886,962 B2
(45) Date of Patent: Feb. 6, 2018

(54) EXTRACTING AUDIO FINGERPRINTS IN THE COMPRESSED DOMAIN

(71) Applicant: Google Inc., Mountain View, CA (US)

(72) Inventors: Giovanni Motta, San Jose, CA (US); Yang Lu, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 317 days.

(21) Appl. No.: 14/635,779

(22) Filed: Mar. 2, 2015

(65) Prior Publication Data
US 2016/0260437 A1 Sep. 8, 2016

(51) Int. Cl.
G10L 19/00 (2013.01)
G10L 21/00 (2013.01)
G10L 19/018 (2013.01)
H04N 21/8358 (2011.01)

(52) U.S. Cl.
CPC ....... *G10L 19/018* (2013.01); *H04N 21/8358* (2013.01)

(58) Field of Classification Search
None
See application file for complete search history.

(56) References Cited

U.S. PATENT DOCUMENTS

| 7,873,515 | B2* | 1/2011 | Padhi | G10L 19/005 704/219 |
| 8,214,223 | B2* | 7/2012 | Thesing | G10L 19/008 381/2 |
| 8,532,382 | B1* | 9/2013 | Ioffe | G06F 17/30814 382/168 |
| 8,611,689 | B1* | 12/2013 | Yagnik | G06K 9/00711 380/210 |
| 8,868,433 | B2* | 10/2014 | Thesing | G10L 19/008 381/2 |
| 8,947,595 | B1* | 2/2015 | Tucker | H04N 21/231 348/445 |
| 8,965,859 | B1* | 2/2015 | Ioffe | G06F 17/3002 707/698 |
| 9,159,327 | B1* | 10/2015 | Postelnicu | G10L 19/018 |
| 9,258,604 | B1* | 2/2016 | Bilobrov | H04N 21/4586 |
| 9,275,427 | B1* | 3/2016 | Sharifi | G06T 1/0021 |
| 9,286,909 | B2* | 3/2016 | Perez Gonzalez | G10L 25/18 |
| 9,367,887 | B1* | 6/2016 | Sharifi | G06T 1/0021 |

(Continued)

OTHER PUBLICATIONS

W. Li "A Compression-Domain Audio Finergerprint Technique Based on the Mathematical Expectation of MDCT Spectrum" International Journal of Advancements in Computing Technology, vol. 5, No. 9, May 2013, pp. 291-298.

(Continued)

*Primary Examiner* — Satwant Singh
(74) *Attorney, Agent, or Firm* — Morris & Kamlay LLP

(57) ABSTRACT

A computer-implemented method performed by a data processing apparatus includes receiving an audio signal that includes a frequency-domain representation of an audio file, extracting, from the audio signal, a plurality of frequency-domain data values that correspond to at least a portion of the audio file, compressing the plurality of data values to form a compressed frequency domain value file, and transmitting the compressed frequency domain value file to a server to identify the audio file.

18 Claims, 4 Drawing Sheets

(56) References Cited

U.S. PATENT DOCUMENTS

| | | | | |
|---|---|---|---|---|
| 9,390,727 | B2* | 7/2016 | Bilobrov | G10L 19/018 |
| 9,503,781 | B2* | 11/2016 | Bilobrov | H04N 21/4586 |
| 2005/0197724 | A1* | 9/2005 | Neogi | G10L 25/48 |
| | | | | 700/94 |
| 2016/0035355 | A1* | 2/2016 | Thesing | G10L 19/008 |
| | | | | 704/500 |
| 2016/0148620 | A1* | 5/2016 | Bilobrov | G10L 25/54 |
| | | | | 704/270 |
| 2016/0300579 | A1* | 10/2016 | Bilobrov | G10L 19/018 |
| 2017/0070774 | A1* | 3/2017 | Bilobrov | H04N 21/4586 |

OTHER PUBLICATIONS

S. Baluja, and M. Covell. 2006. "Content Fingerprinting Using Wavelets", In Proceedings of the Conference of Visual Media Production, IET (2006).

W. Li, Y. Liu, and X. Xue. 2010. "Robust audio identification for MP3 popular music". In Proceedings of the 33rd international ACM SIGIR conference on Research and development in information retrieval (SIGIR '10).

* cited by examiner

EXTRACTING AUDIO FINGERPRINTS IN THE COMPRESSED DOMAIN

BACKGROUND

In many applications it is useful to be able to identify or verify an audio file by analyzing the content of its audio signal. A portion of the audio file may be acquired to form an audio fingerprint of the file for the purpose of identifying or verifying the file. However, creating a suitable audio fingerprint of the audio file in a format required for processing may be a time-consuming task.

BRIEF SUMMARY

According to an embodiment of the disclosed subject matter, a computer-implemented method performed by a data processing apparatus includes receiving an audio signal that includes a frequency-domain representation of an audio file, extracting, from the audio signal, a plurality of frequency-domain data values that correspond to at least a portion of the audio file, compressing the plurality of data values to form a compressed frequency domain value file, and transmitting the compressed frequency domain value file to a server to identify the audio file.

According to an embodiment of the disclosed subject matter, a decoder includes an input module that receives an audio signal including a frequency-domain representation of an audio file, a bitstream unpacking module that unpacks a bitstream of the audio signal to separate a side information portion of the audio signal from a main data portion of the audio signal, a Huffman decoding module that decodes the main portion of the data, an inverse quantization module that executes inverse quantization on the decoded data to form a frequency-domain representation of the audio file, a binning and compression module to bin the frequency-domain representation of the audio file and compress the binned data to form a compressed frequency domain value file, and an output module to transmit the compressed frequency domain value file to a server to identify the audio file.

According to an embodiment of the disclosed subject matter, means for receiving an audio signal that includes a frequency-domain representation of an audio file, extracting, from the audio signal, a plurality of frequency-domain data values that correspond to at least a portion of the audio file, compressing the plurality of data values to form a compressed frequency domain value file, and transmitting the compressed frequency domain value file to a server to identify the audio file are provided.

Additional features, advantages, and embodiments of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
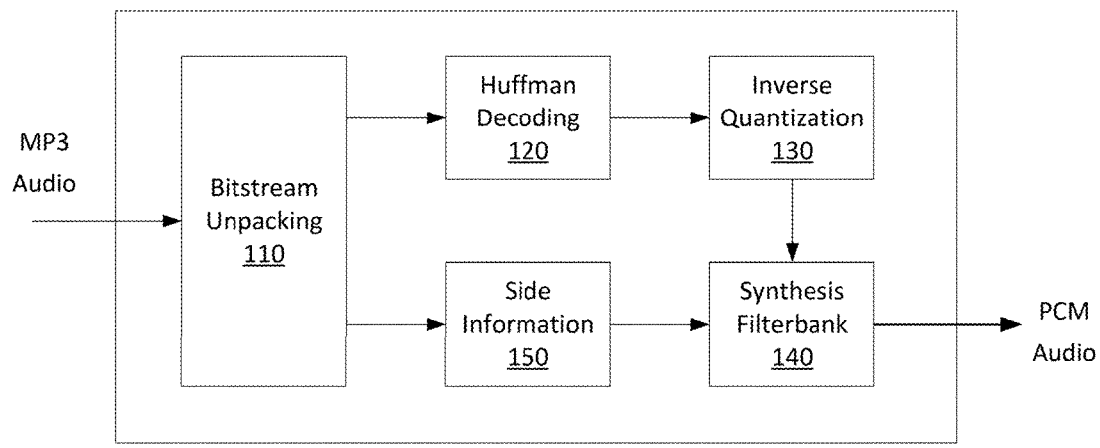
FIG. 1 shows a conventional MP3 decoder.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of disclosure may be practiced without these specific details, or with other methods, components, materials, etc. In other instances, well-known structures and devices are shown in block diagram form to facilitate describing the subject disclosure.

Embodiments of the subject matter disclosed herein relate generally to a method and system of creating audio fingerprints to identify digital audio files. In embodiments disclosed herein, compressed frequency domain values may be generated for an audio file by using a shortened decoding process that does not require completely decoding a file. A fingerprint process is further disclosed which utilizes the compressed frequency domain values and does not require an uncompressed file input or audio spectral image computation. A mobile device or a device with limited computing power, for example, may employ the techniques described herein to generate audio fingerprints with minimized computation, improved speed and improved accuracy.

A digital audio file may be encoded in any of various formats, including compressed and uncompressed formats. Compressed digital audio file formats include, for example, MPEG-1 or MPEG-2 Audio Layer III (MP3), Advanced Audio Coding (AAC), or Windows Media Audio (WMA). Uncompressed audio file formats include, for example, waveform (WAV), which is a popular format for CD's and encoded using pulse-code modulation (PCM). An audio file in an uncompressed format may provide superior sound quality compared to a compressed format, however, compressed formats generally result in a file size far smaller than uncompressed formats. Accordingly, compressed formats are preferred for audio files that are uploaded/downloaded between a user device and a server, for example, in order to decrease traffic and to lower file transfer time.

Many conventional audio fingerprinting techniques are executed on uncompressed audio files, usually in PCM format. To use such audio fingerprinting techniques, an audio file stored in a compressed format, such as MP3, must first be fully decoded to PCM so that the audio file may be processed to compute the audio fingerprint. According to the present embodiments disclosed herein, a full decoding operation may be avoided by extracting intermediate frequency-domain data during a modified decoding process. The extracted frequency-domain data may then be used to create an audio fingerprint.

Embodiments disclosed herein generally are not limited to relying upon extracting frequency-domain data in a single form. Suitable frequency-domain data for an audio file may be available for extraction in a number of forms depending at least in part on the way that the audio file was encoded.

Many different encoding processes exist for encoding a digital audio file. Such encoding processes may include operations comprising sampling the audio file in the time-domain and transforming the samples to the frequency-domain for various processing purposes. For example, there are many different ways to encode an audio file in the MP3 format, but MP3 encoding generally includes passing the audio signal of the file through a polyphase filterbank for dividing the signal into subbands and performing time-domain to frequency-domain mapping. While in the frequency-domain, a psychoacoustic model is applied to discard audio data that is likely to be inaudible to human ears. The remaining data is quantized and formatted to be assembled into frames. A modified discrete cosine transform (MDCT) is used at the output of the polyphase filterbank and at the output of the psychoacoustics in order to limit the sources of output distortion.

Applying the disclosed subject matter to an MP3 format audio file, the frequency-domain data representation of audio data to be extracted may comprise the MDCT coefficients. This data may be extracted in a modified, partial decode of the MP3 file. While the present embodiments are not limited in application to the MP3 format, a description of an embodiment for extracting the frequency-domain data representation of audio data in the form of MDCT coefficients from an MP3 audio file will be instructive. First, a conventional MP3 decoding process will be briefly described.

FIG. 1 illustrates an overview of an MP3 decoder 100 that receives an MP3 audio signal as input and outputs a PCM audio signal. Bitstream unpacking module 110 unpacks the MP3 audio data, separating the side information from the main audio data. Subsequently, Huffman decoding module 120 decodes main audio data received from the bitstream unpacking module. An inverse quantization module 130 restores the resolution of the decoded main data. The inverse quantized data is passed through a synthesis filterbank 140, which applies an inverse MDCT to the data. The output of the filterbank is PCM format data.

Conventional audio fingerprint techniques often use the PCM format data to create audio fingerprints. An overview of an example conventional audio fingerprint process 200 (FIG. 2) that may be used to compute audio fingerprints from PCM format data will also be instructive. While a brief summary is provided below, the process 200 is described in greater detail in "Content Fingerprinting Using Wavelets," S. Baluja and M. Covell, In Proceedings of the Conference of Visual Media Production, IET (2006) (hereinafter, "Baluja").

Figure 2:
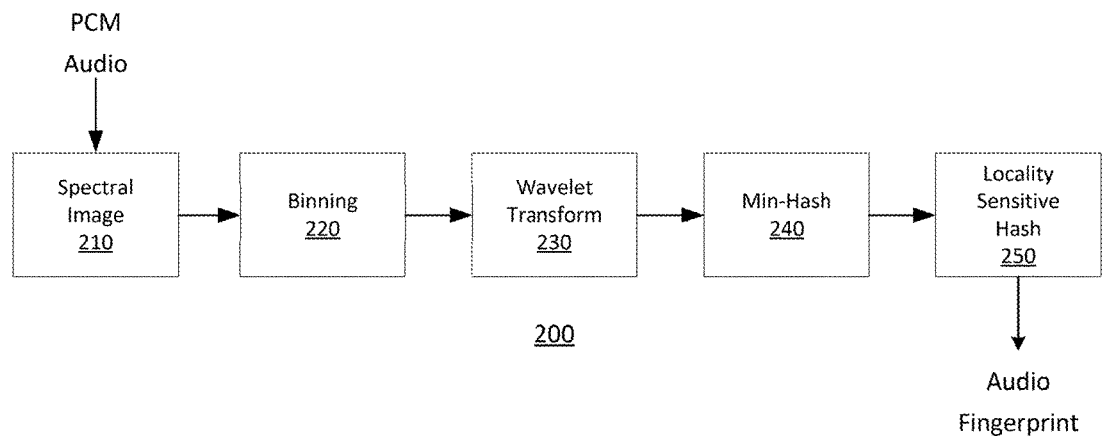
FIG. 2 shows a conventional audio fingerprint process.

Referring to FIG. 2, processing the PCM sample to create an audio fingerprint computation begins with calculation of a short time power spectrum at operation 210, a potentially time consuming operation that may be performed by using Fast Fourier transforms (FFT). The power spectrum is then filtered into a small number of perceptually motivated frequency bands, then grouped to form "auditory image" samples at operation 220. Wavelets are computed on each auditory image at 230, and a binary representation of the top t % wavelets is created, e.g., based on the sign of each wavelet. At operation 230 a Min-Hash technique is used to create sub-fingerprints by reducing the size of signatures from the intermediate wavelet representation to a compact representation of p values. In other words, after operations 210 through 230 are complete, each spectral image (or equivalent-length audio segment) is represented by a series of p 8-bit integers, i.e., the sub-fingerprint. A Locality-Sensitive Hashing (LSH) technique is used at operation 240 to select which sub-fingerprints will be used for matching purposes in searching for the audio file in a database, that is, which sub-fingerprints comprise the audio fingerprint used to find a matching audio file.

The audio fingerprint process 200 shown in FIG. 2 describes an overview of one example process for deriving an audio fingerprint from PCM format data. A person of ordinary skill in the art will be aware that other audio fingerprint processes exist, and more specifically, other audio fingerprint processes exist with a common starting point of processing auditory image data.

Audio fingerprint processes disclosed herein may differ from the process 200 in that the requirements of fully decoding to PCM format and of creating spectral auditory images are eliminated. Instead, representative frequency information may be extracted directly from the encoded audio signal and a frequency representation may be subsequently processed in accordance with the remaining techniques. Therefore, in an illustrative use case of an MP3 audio file, the audio fingerprint process of the present invention may receive an input based on the MDCT coefficients and process the input to create audio fingerprints, e.g, using operations 230 to 240 in FIG. 2. In this manner the overall audio fingerprint process may be shortened.

Figure 3:
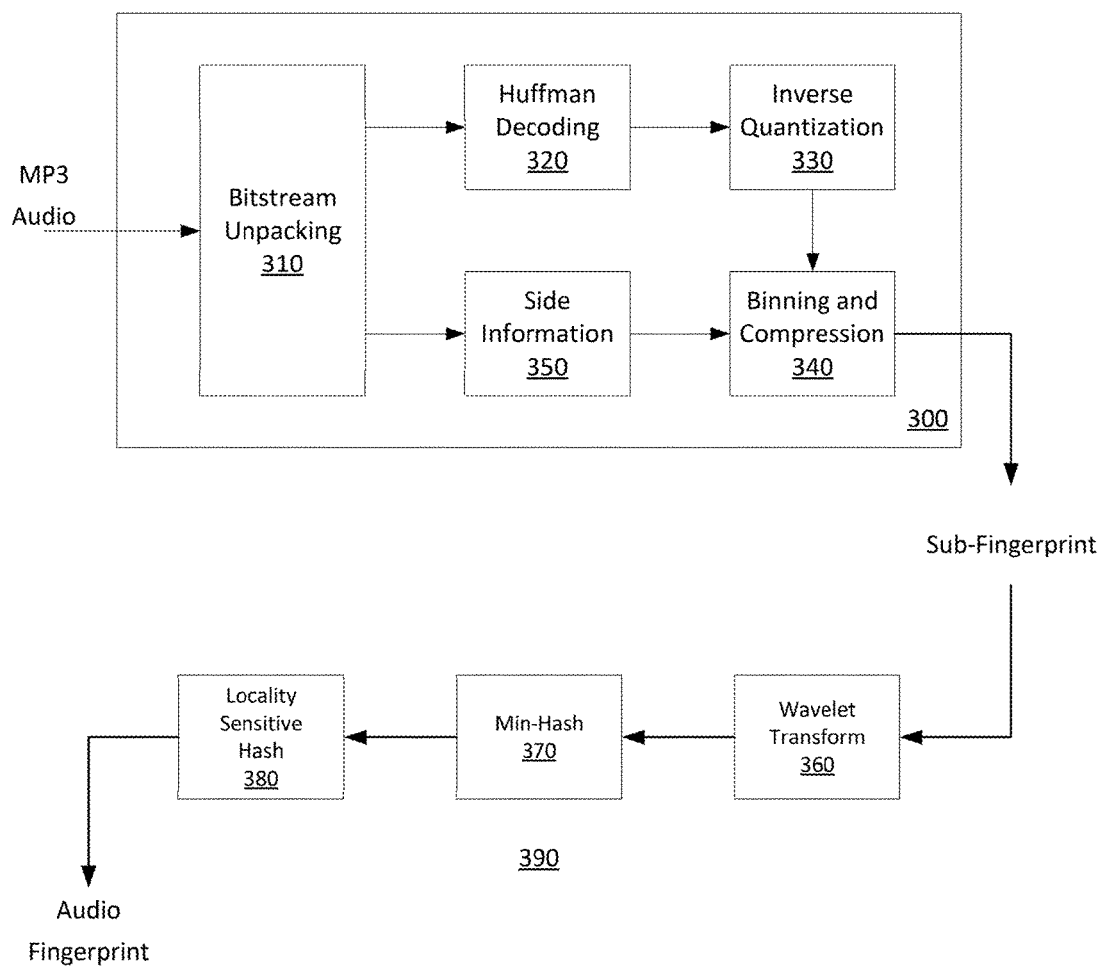
FIG. 3 shows a decoder and audio fingerprint process according to an embodiment of the disclosed subject matter.

FIG. 3 illustrates an embodiment of a decoder 300 and fingerprint process 360 according to the presently disclosed invention. A bitstream unpacking module 310 unpacks the MP3 audio data, separating the side information from the main audio data. A Huffman decoding module 320 decodes main audio data received from the bitstream unpacking module. An inverse quantization module 330 resolves the resolution of the decoded main data. The inverse quantized data may comprise a floating point representation of the audio data in the frequency domain. The coefficients of the frequency representation may be sent to a binning and compression module 340. The coefficients may be binned and concatenated for a sequence of frames to generate a frequency representation file of the audio file, herein referred to as a compressed frequency domain value file. A more compact frequency representation file can be obtained by quantizing each coefficient in a frame with a variable step that depends on the maximum (and optionally minimum) value in that frame.

Further compression of the frequency representation file can be obtained by exploiting temporal redundancy and predicting the quantized coefficients in a frame by using the previous coefficients. For example, in a case of the binning and compression module binning the coefficients into 32 bins, each represented by a 32-bit floating point value, a 256 level quantization provides 3.2:1 to 3.5:1 compression. Temporal prediction may be capable of doubling that amount.

FIG. 3 also shows an audio fingerprint process 360 that receives the output of the decoder 300 and computes an audio fingerprint. At operation 360, a wavelet transform is applied to the compressed frequency domain value. At operation 370 a Min-Hash technique is used to create compressed frequency domain values by reducing the size of signatures from the intermediate wavelet representation to a compact representation of p values. A Locality-Sensitive Hashing (LSH) technique is used at operation 380 to select which compressed frequency domain values will be used for matching purposes in searching for the audio file in a database, that is, which compressed frequency domain values comprise the audio fingerprint used to find a matching audio file.

Figure 4:
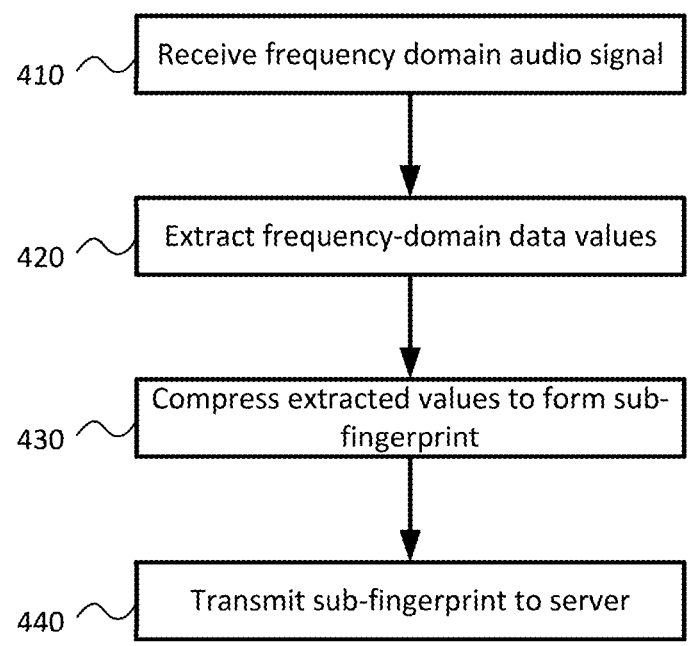
FIG. 4 shows a flowchart of an audio fingerprint process according to an embodiment of the disclosed subject matter.

FIG. 4 illustrates a flowchart of an embodiment of the present invention. At operation 410, an audio signal that includes a frequency-domain representation of an audio file is received. At operation 420, a plurality of frequency-domain data values that correspond to at least a portion of the audio file are extracted from the audio signal. At operation 430 the plurality of data values are compressed to form a compressed frequency domain value file. At operation 440 the compressed frequency domain value file is transmitted to a server to identify the audio file.

It should be understood that embodiments of the audio fingerprint technique of the subject invention is applicable in many contexts, and that the inherent benefits of using the techniques of the subject invention may be exploited in various ways. An illustrative example will now be provided in which embodiments of the present invention are applied within the context of an "audio locker" network service.

In an audio locker network service, a user may maintain an account with the service, having one or more audio files associated with the account. By logging into the account remotely, the user may have access to his/her full library of audio files anywhere that network service is available. When the user is initially uploading audio files (hereinafter, also referred to as "tracks") to the service, it may be useful for the audio locker to first check whether an identical track is already present in an associated service, such as an online store. If an identical track exists in the store and has appropriate rights, the audio locker may provide the option of foregoing the track upload and, for that user, stream the canonical store copy of the track instead. This functionality will be referred to herein as "scan and match."

During a scan and match process, the track that the user intends to upload must be identified, typically by an audio fingerprint. In order to avoid a full upload to the network service but still reliably verify ownership of the track with a minimum processing load on the client, a scan and match process may work in four phases. First, the metadata and a hash of the audio track is uploaded to the network service. Second, the service verifies the presence in the store of one or more tracks that have the required licensing rights. These licensed tracks are called matching candidates. When one or more matching candidates exist, the service may request a proof of ownership from the client, e.g., a short snippet selected from the user audio at a random position. Third, the client extracts the audio snippet as requested by the server and uploads it. Depending on the audio format, transcoding may be necessary. Fourth, the snippet is used to match the audio against the matching candidates.

The audio snippet is uploaded to the server and compared to store audio by using audio fingerprints. In a conventional audio locker, to constrain bandwidth while maintaining a reasonable precision and recall at least fifteen seconds of audio typically need to be uploaded, in an MP3 format of at least 128 Kbps. If the user audio is not already in the required format, then transcoding is necessary. Transcoding involves decoding of the audio file in PCM and re-encoding in the required output format. The encoding is typically time consuming and requires approximately one order of magnitude more resources than decoding.

As described above regarding FIG. 2, the audio fingerprints are typically computed on PCM samples (raw audio samples), so the snippet needs to be decompressed again by the server. After decoding, conventional fingerprint computation requires calculation of short time power spectrum, another time consuming operation.

In contrast, applying the embodiments disclosed herein, frequency-domain information may be extracted directly from the encoded stream to avoid transcoding on the client side, as well as avoid full decoding and spectral calculations on the server side. The compressed frequency domain value file may be generated on client side, i.e., the client may implement the decoder 300 of FIG. 3. The server may be configured to implement the audio fingerprint process 390 of FIG. 3, or some other audio fingerprint process that can receive the compressed frequency domain value file as an input.

This technique may present several advantages over existing solutions. For example, the compressed frequency domain value file can be generated with minimal computation on the client. Another advantage is, if the user audio is already in one of the supported compressed formats (MP3, for example), no transcoding is necessary. Experiments showed that as long as the sample rate is known, encoding bitrate does not impact precision and recall.

In addition, a quantized representation of the binned frequency coefficients can be very compact and a compressed frequency domain value file of a long audio segment, or even of the entire audio file, can be uploaded instead of just a 15 second snippet. Empirically, the frequency representation extracted from the coefficients in the compressed domain has been found to be more precise than FFT alternatives, and it allows a better discrimination between different versions of the same audio file (explicit vs. edited versions, remasterings, etc.). Furthermore, binned coefficients can be collected during the first step of scan and match and transmitted to the server together with metadata and audio hash. This can greatly improve latency as the server can match both metadata and audio, verify ownership, and make a decision without a second exchange with the client In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a system as disclosed herein.

Figure 5:
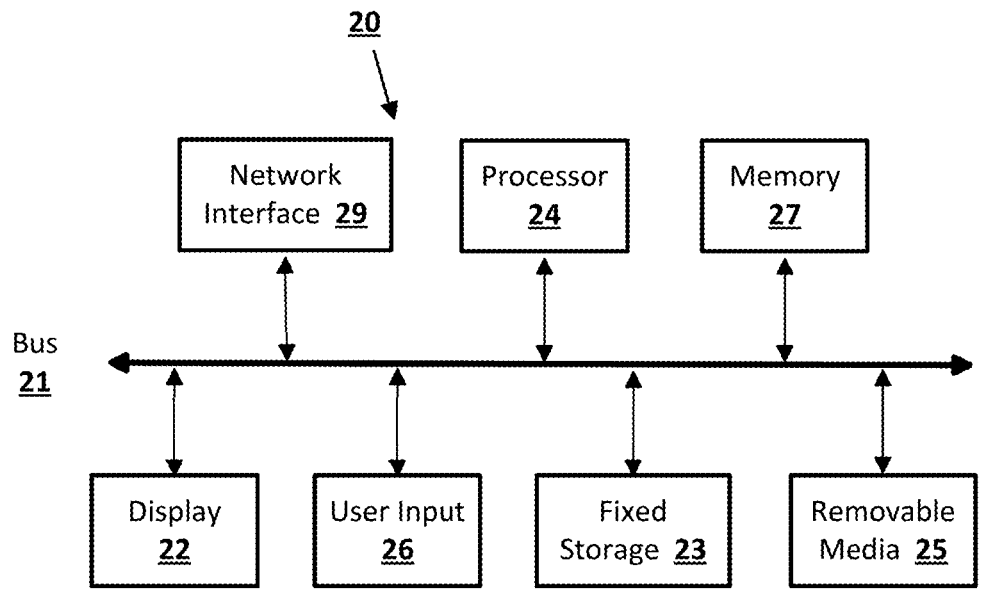
FIG. 5 shows a computing device according to an embodiment of the disclosed subject matter.

Embodiments of the presently disclosed subject matter may be implemented in and used with a variety of component and network architectures. FIG. 5 is an example computing device 20 suitable for implementing embodiments of the presently disclosed subject matter. The device 20 may be a client device implemented as, for example, a desktop or laptop computer, or a mobile computing device such as a smart phone, tablet, or the like. The device 20 may include a bus 21 which interconnects major components of the computer 20, such as a central processor 24, a memory 27 such as Random Access Memory (RAM), Read Only Memory (ROM), flash RAM, or the like, a user display 22 such as a display screen, a user input interface 26, which may include one or more controllers and associated user input devices such as a keyboard, mouse, touch screen, and the like, a fixed storage 23 such as a hard drive, flash storage, and the like, a removable media component 25 operative to control and receive an optical disk, flash drive, and the like, and a network interface 29 operable to communicate with one or more remote devices via a suitable network connection.

The bus 21 allows data communication between the central processor 24 and one or more memory components, which may include RAM, ROM, and other memory, as previously noted. Typically RAM is the main memory into which an operating system and application programs are loaded. A ROM or flash memory component can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, WiFi, Bluetooth®, near-field, and the like. For example, the network interface 29 may allow the computer to communicate with other computers via one or more local, wide-area, or other communication networks, as described in further detail below.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
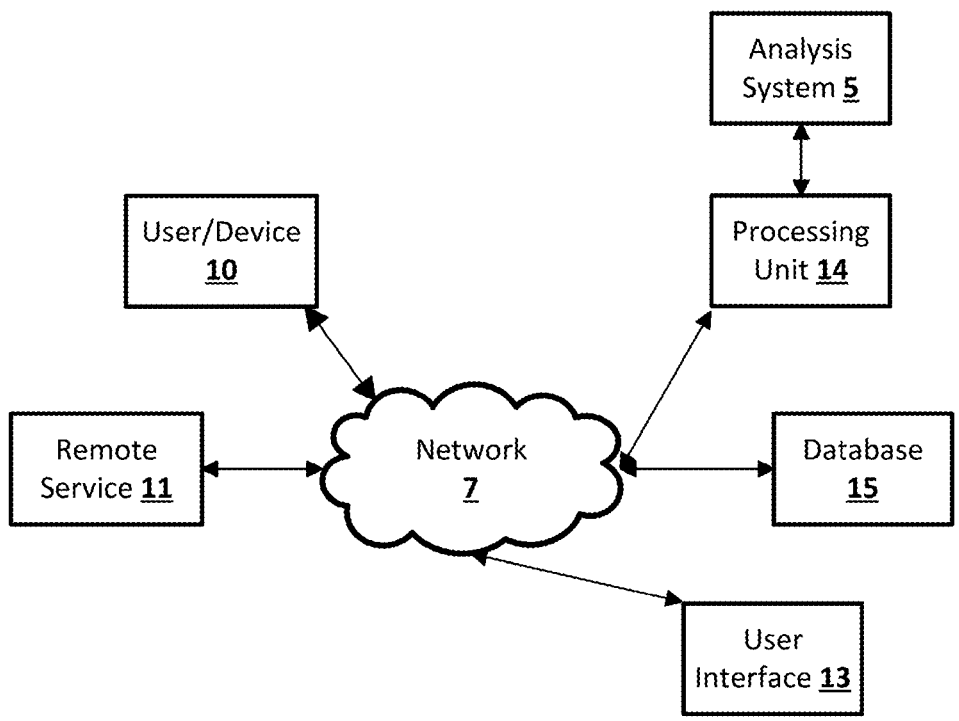
FIG. 6 shows an example network and system configuration according to an embodiment of the disclosed subject matter

FIG. 6 shows an example arrangement according to an embodiment of the disclosed subject matter. One or more devices or systems 10, 11, such as remote services or service providers 11, user devices 10 such as local computers, smart phones, tablet computing devices, and the like, may connect to other devices via one or more networks 7. The network may be a local network, wide-area network, the Internet, or any other suitable communication network or networks, and may be implemented on any suitable platform including wired and/or wireless networks. The devices 10, 11 may communicate with one or more remote computer systems, such as processing units 14, databases 15, and user interface systems 13. In some cases, the devices 10, 11 may communicate with a user-facing interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to a web browser client on a user device 10, and a computer-readable API or other interface is provided to a remote service client 11.

The user interface 13, database 15, and/or processing units 14 may be part of an integral system, or may include multiple computer systems communicating via a private network, the Internet, or any other suitable network. One or more processing units 14 may be, for example, part of a distributed system such as a cloud-based computing system, audio locker, online store, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method to create a compressed frequency domain file that can be used to create an audio fingerprint to identify an audio file, performed by a data processing apparatus, the method comprising:
   receiving an audio signal that includes a frequency-domain representation of the audio file;
   extracting, from the audio signal, a plurality of frequency-domain data values that correspond to at least a portion of the audio file;
   compressing the plurality of data values to form a compressed frequency domain value file;
   transmitting the compressed frequency domain value file to a server; and
   receiving an indication from the server of whether the server has a copy of the audio file based on the audio fingerprint created by the server from the compressed frequency domain value file.

2. The computer-implemented method of claim 1, wherein compressing the plurality of data values comprises:
   binning the plurality of data values; and
   concatenating the binned data values.

3. The computer-implemented method of claim 1, wherein the extracting operation comprises:
   unpacking a bitstream of the audio signal to separate a side information portion of the audio signal from a main data portion of the audio signal;
   performing Huffman decoding on the main data portion;
   performing inverse quantization on the decoded data; and
   obtaining the plurality of data values from the inverse quantized data.

4. The computer-implemented method of claim 1, further comprising transmitting metadata and audio hash data associated with the audio file to the server along with the compressed frequency domain value file.

5. The computer-implemented method of claim 1, wherein the plurality of data values comprises a plurality of coefficients derived from a time-to-frequency domain transform of the audio file.

6. The computer-implemented method of claim 5, wherein the transform comprises a modified discrete cosine transform.

7. The computer-implemented method of claim 5, wherein the audio signal includes a plurality of frames, with the plurality of coefficients corresponding to audio file data represented across the plurality of frames, and wherein the computer-implemented method further comprises quantizing each coefficient in each frame of the audio signal.

8. The computer-implemented method of claim 7, wherein quantizing each coefficient comprises quantizing each coefficient in each frame of the audio signal with a variable step that is determined dependent upon a maximum value of each frame.

9. The computer-implemented method of claim 7, wherein quantizing each coefficient comprises quantizing each coefficient in each frame of the audio signal with a variable step that is determined dependent upon a maximum value frame and a minimum value of each frame.

10. A computer-implemented method to create an audio fingerprint that can be used to identify an audio file, comprising:
    performing a wavelet transformation on a compressed frequency domain value file of the audio file to convert the compressed frequency domain value file to a wavelet-vector;
    performing a Min-Hash operation on the wavelet-vector to create compressed frequency domain value representations of the audio file; and
    performing Locality Sensitive-Hashing (LSH) on the compressed frequency domain value representations; and
    selecting compressed frequency domain value representations to create the audio fingerprint of the audio file.

11. A decoder configured to create a compressed frequency domain file that can be used to create an audio fingerprint to identify an audio file, comprising:
    an input module that receives an audio signal including a frequency-domain representation of the audio file;
    a bitstream unpacking module that unpacks a bitstream of the audio signal to separate a side information portion of the audio signal from a main data portion of the audio signal;
    a Huffman decoding module that decodes the main portion of the data;
    an inverse quantization module that executes inverse quantization on the decoded data to form a frequency-domain representation of the audio file;
    a binning and compression module to bin the frequency-domain representation of the audio file and compress the binned data to form a compressed frequency domain value file; and
    an output module to transmit the compressed frequency domain value file to a server to identify the audio file based on the compressed frequency domain value file.

12. The decoder of claim 11, wherein the output module is further configured to transmit metadata and audio hash data associated with the audio file to the server along with the compressed frequency domain value file.

13. The decoder of claim 11, wherein the binned data values comprise a plurality of coefficients derived from a time-to-frequency domain transform of the audio file.

14. The decoder of claim 11, wherein the binning and compression module compresses the binned data by concatenating.

15. The decoder of claim 13, wherein the transform comprises a modified discrete cosine transform.

16. The decoder of claim 11, wherein the audio signal includes a plurality of frames, with the plurality of coefficients corresponding to audio file data represented across the plurality of frames, and wherein the binning and compressing module further compresses the binned data values by quantizing each coefficient in each frame of the audio signal.

17. The decoder of claim 16, wherein the binning and compressing module quantizes each coefficient in each frame of the audio signal with a variable step that is determined dependent upon a maximum value of each frame.

18. The decoder of claim 16, wherein the binning and compressing module quantizes each coefficient in each frame of the audio signal with a variable step that is determined dependent upon a maximum value frame and a minimum value of each frame.

* * * * *